United States Patent Office 3,349,599
Patented Oct. 31, 1967

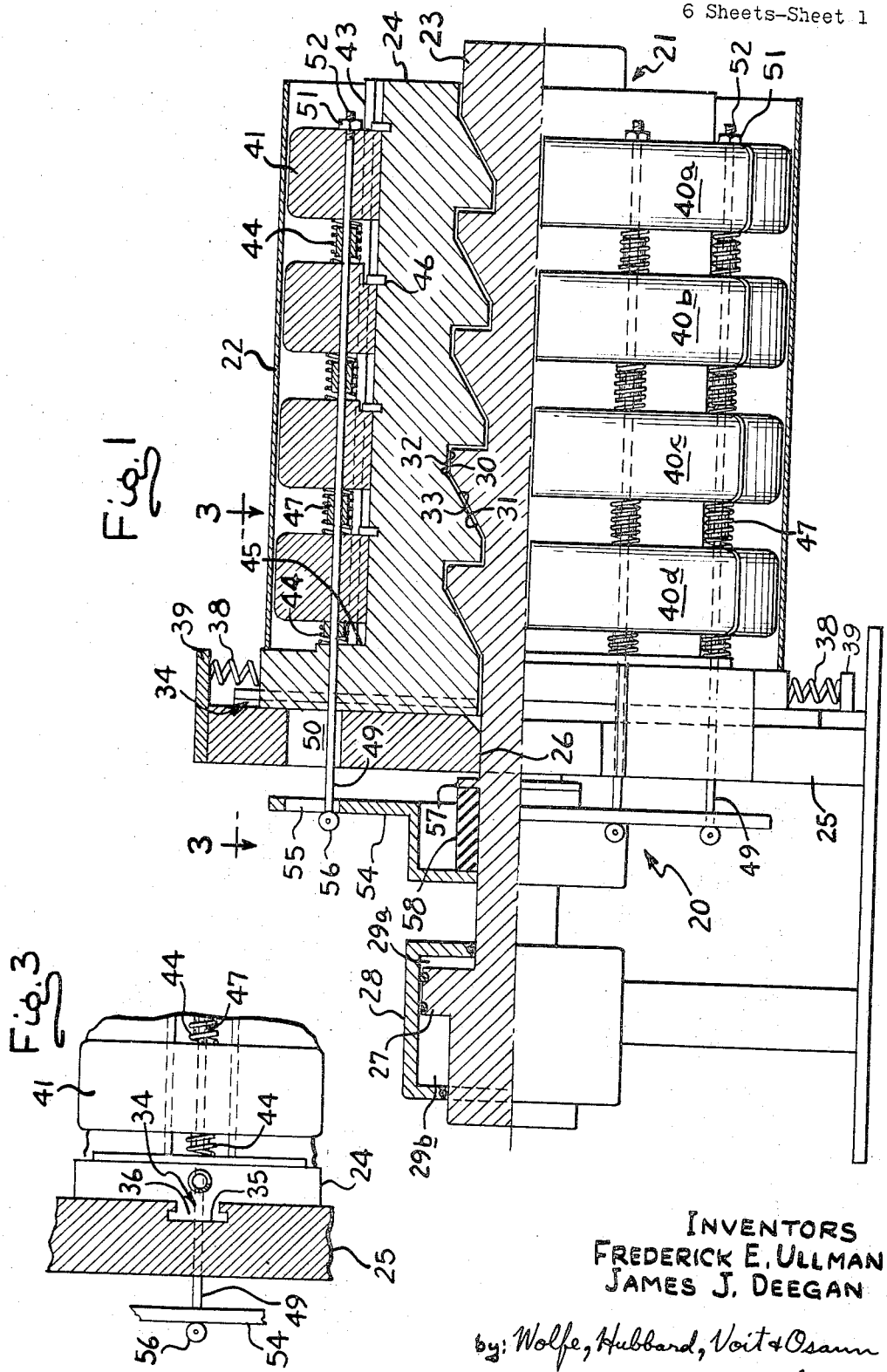

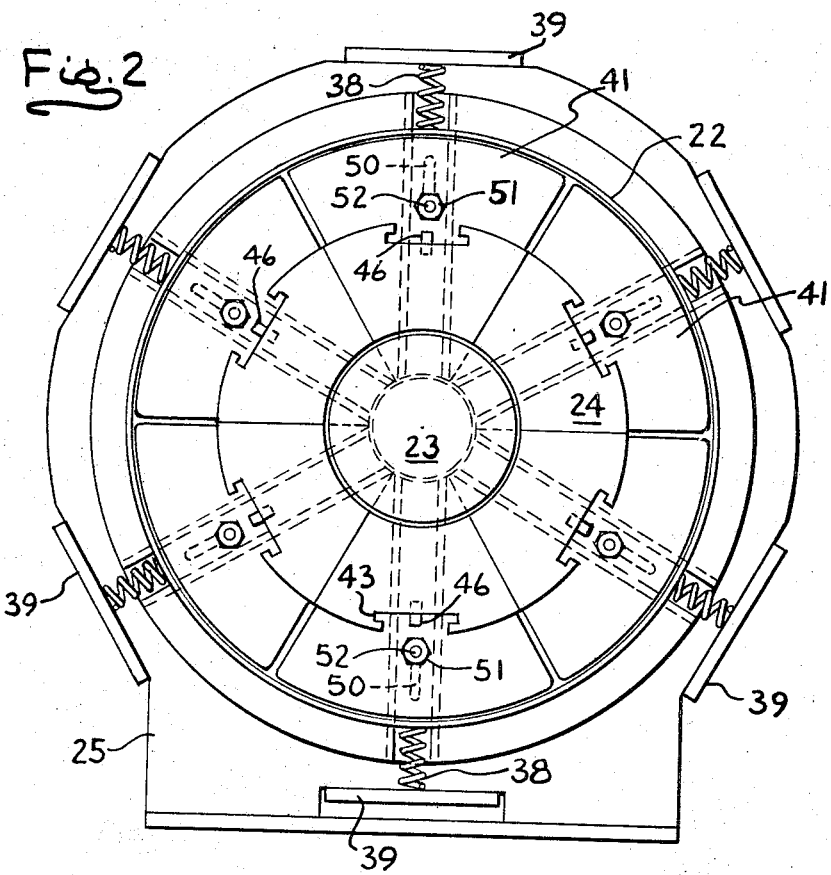
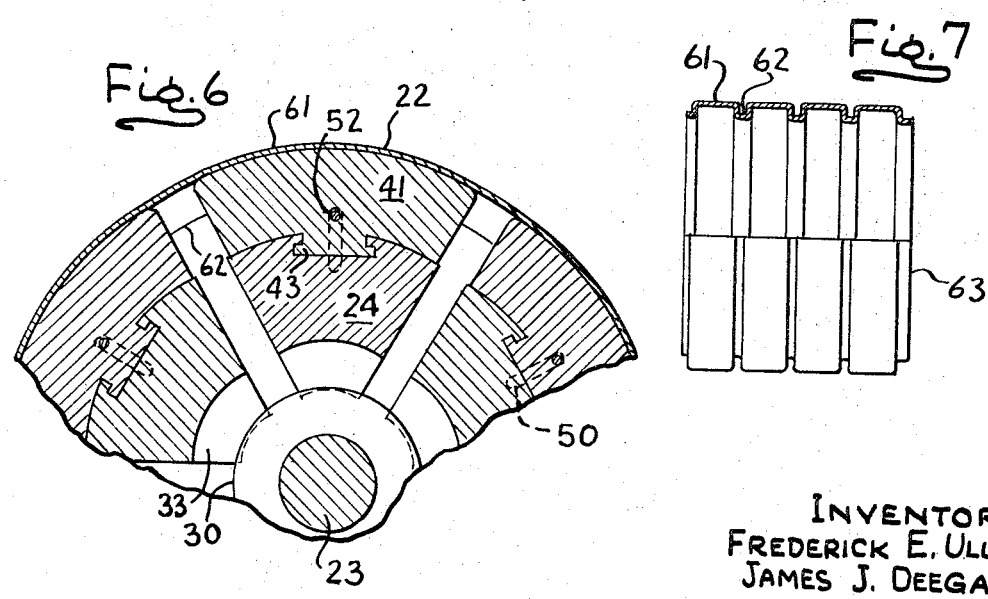

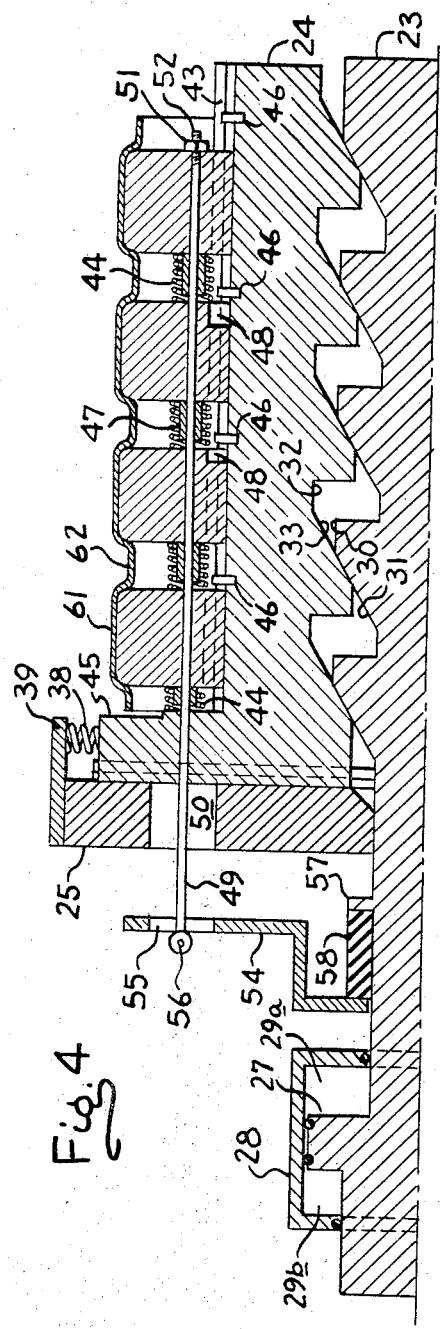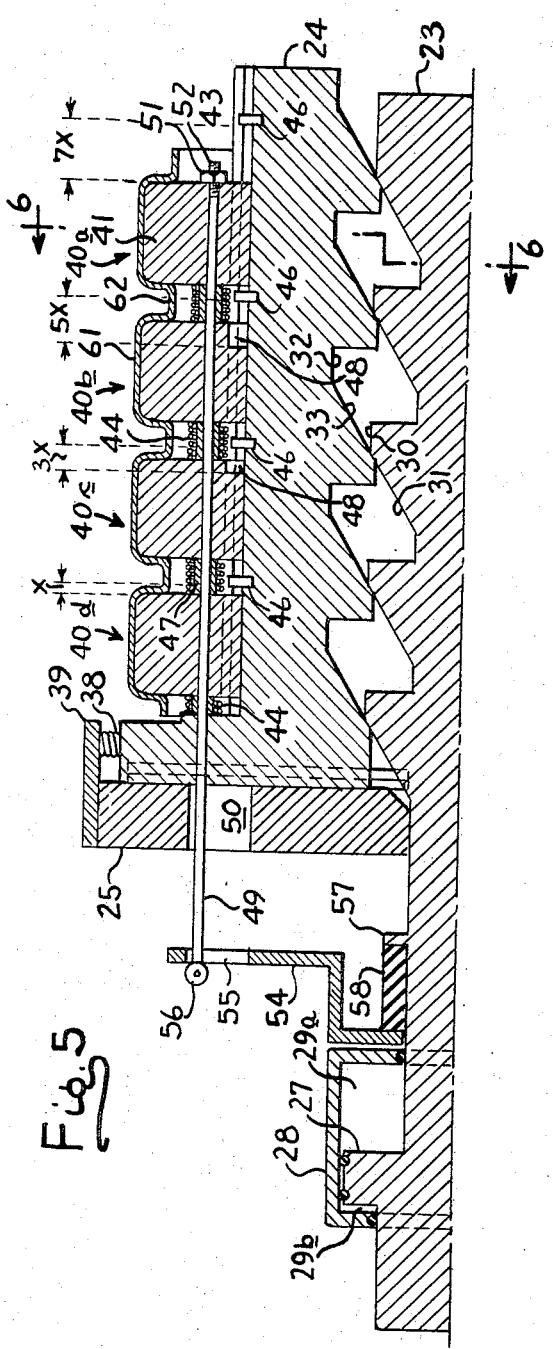

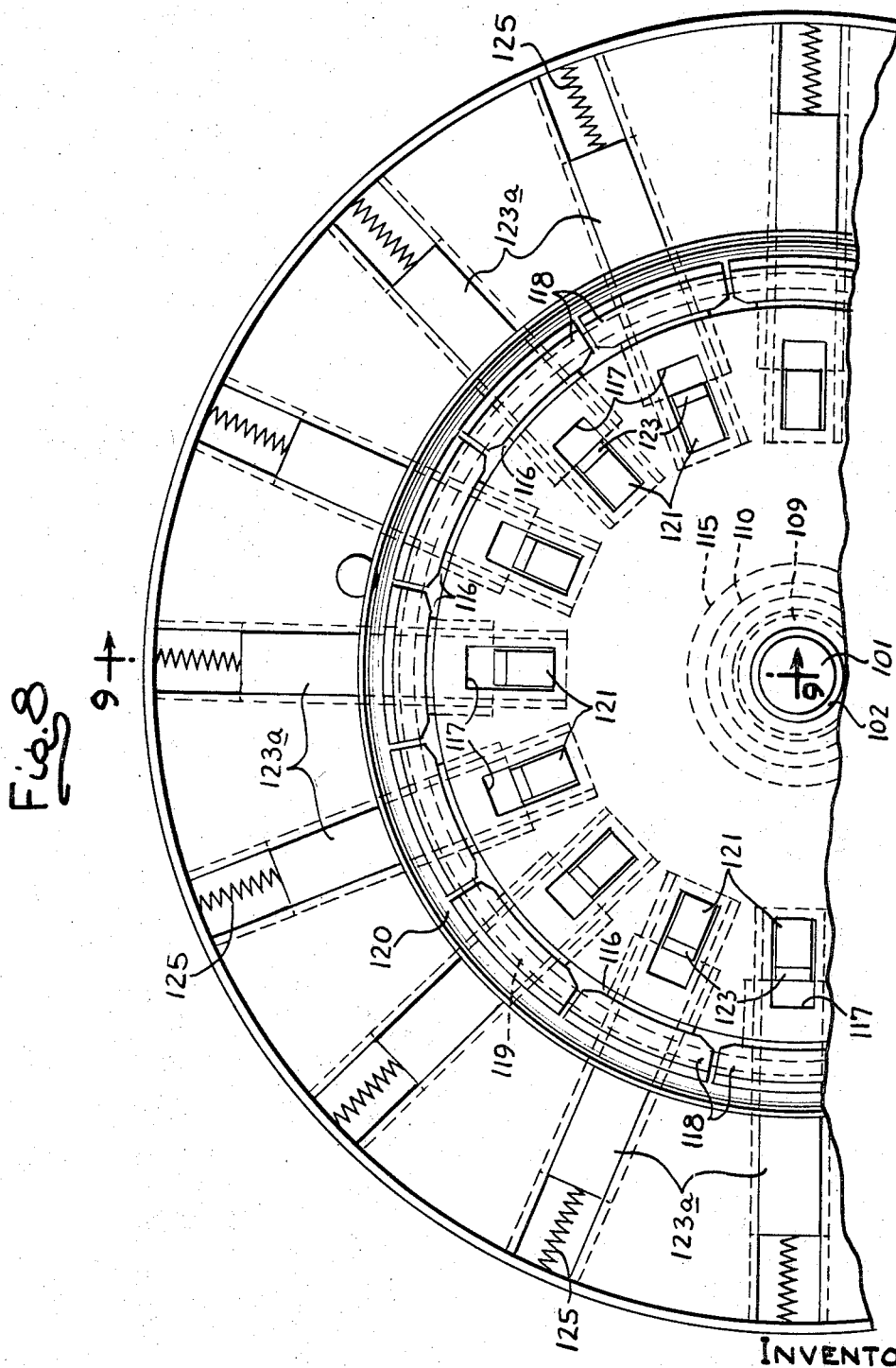

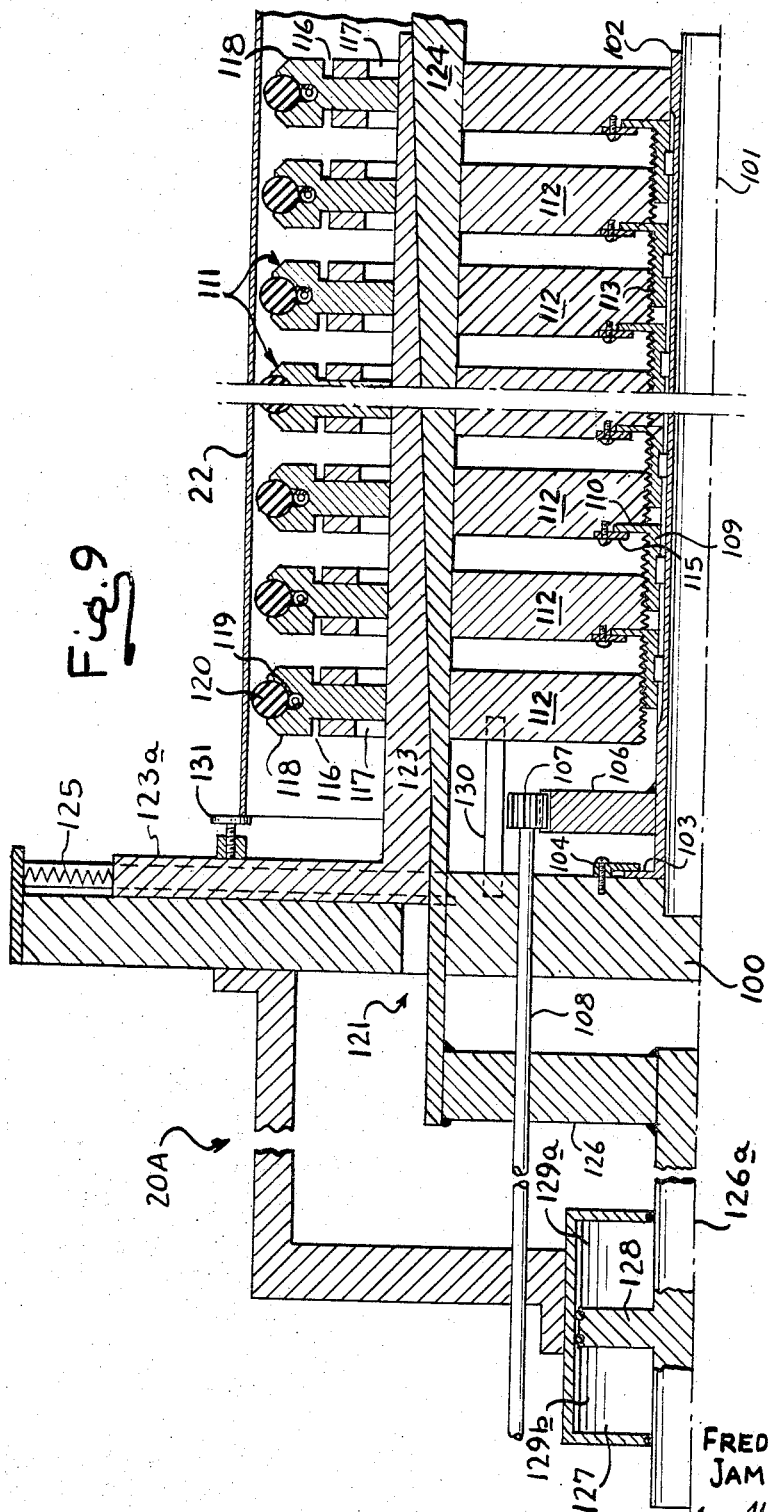

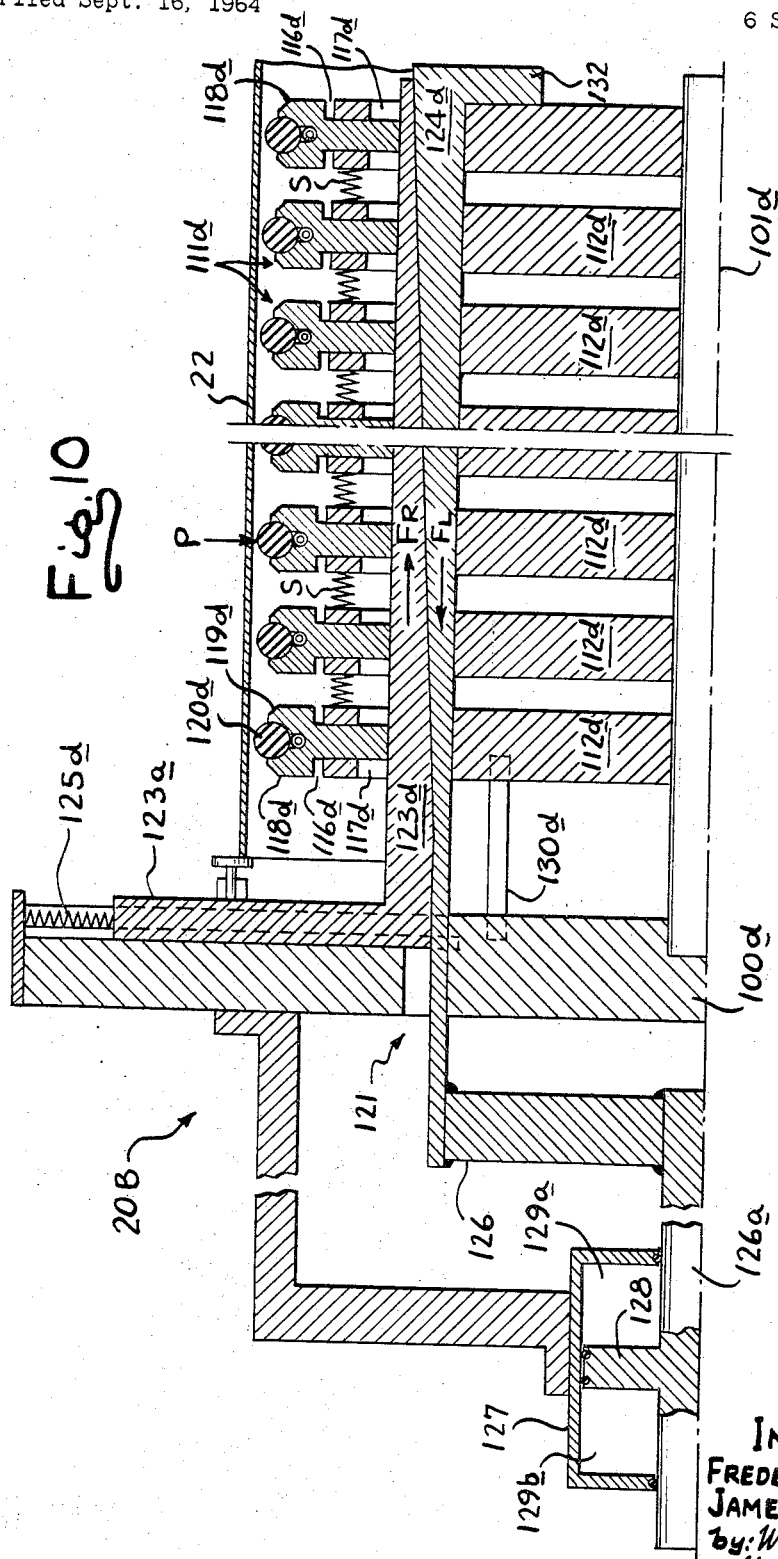

3,349,599
METHOD AND APPARATUS FOR FORMING A BEADED SHELL
Frederick E. Ullman, Winnetka, and James J. Deegan, La Grange, Ill., assignors to Inland Steel Company, Chicago, Ill., a corporation of Delaware
Filed Sept. 16, 1964, Ser. No. 396,831
13 Claims. (Cl. 72—393)

ABSTRACT OF THE DISCLOSURE

Method and apparatus for expanding a plurality of radially extending peripheral beads alternating with a plurality of radially inwardly extending furrows in a cylindrical sheet metal blank wherein the material is stressed primarily in a radial and circumferential direction with the strain in the longitudinal or axial direction being controlled with minimum values.

Bead forming apparatus having a plurality of radially expansible internal die units which are axially shiftable relative to the axis of the apparatus with the die units being expanded and controllably collapsed axially to form the alternating beads and furrows in the shell.

An apparatus for forming a beaded shell having axially shiftable and radially extensible die units wherein oppositely directed frictional force components are equal and serve to cancel one another.

---

The present invention relates generally to metal forming methods and apparatus and, more particularly, to methods and apparatus for forming a plurality of axially spaced peripheral beads in a hollow, substantially cylindrical, sheet metal blank. In its principal aspect, the invention is concerned with improved methods and apparatus for locally expanding a hollow sheet metal blank so as to form therein a plurality of axially spaced peripheral beads alternating with a plurality of axially spaced peripheral furrows, yet wherein the net axial strain created in the blank during the beading or metal deforming operation is minimized, thereby producing a finished beaded product characterized by its ability to withstand a maximum amount of deformation without fracture.

A peripherally beaded product of the type that may be advantageously formed by the methods and apparatus of the present invention is described and claimed in the copending application of M. J. M. Coppens, Serial No. 273,071, filed July 5, 1963, now abandoned, and copending divisional application thereof of M. J. M. Coppens, Ser. No. 470,983, filed July 12, 1965, now U.S. Patent 3,268,109, all assigned to the assignee of the present invention. Thus, there is disclosed and claimed in the aforesaid Coppens applications a peripherally beaded sidewall for use with sheet metal shipping containers. Such applications further disclose and claim a method for forming a beaded container sidewall wherein the hollow blank is locally expanded in the regions where the beads are to be formed while at the same time the blank material on either side of each bead being formed is permitted to move towards the beads with the relationship between radial expansion and axial contraction of the blank being controlled so as to minimize the average net axial strain created in the blank. Since the average net axial strain is minimized, the blank material can be deformed to a greater extent without risk of fracturing or otherwise damaging the material. Moreover, the finished product can withstand greater deformation forces of the type normally encountered during shipping or handling than could a similar beaded product which is made without controlling the average net axial strain.

Numerous different approaches have heretofore been utilized for forming peripherally beaded products. For example, one common approach has involved the use of internal expanders employing expandable die segments which are utilized for forming beads in a cylindrical shell. However, with such expanders the die segments are constrained to move directly outward along radial lines. Consequently, such expanders are incapable of simultaneously forming a plurality of beads in a shell in such a manner as to minimize the average net axial strain created therein.

Another early approach to the problem of forming beaded sidewall configurations is that disclosed in U.S. Patent No. 3,099,311, issued July 30, 1963, to O. J. Van Leer et al. Thus, in the aforesaid Van Leer et al. patent there is disclosed and claimed an apparatus employing a plurality of axially floatable external die segments together with an internally disposed, hydraulically expansible rubber bag. The arrangement is such that the cylindrical blank is interposed between the external die segments and the internally disposed rubber bag. The latter is then pressurized so as to locally expand the blank to form beads complementary to die cavities formed in the external die segments. The die segments are, in turn, collapsed axially to foreshorten the blank as the latter is expanded. While the apparatus disclosed and claimed in the Van Leer, et al. patent does constitute a substantial improvement over the types of forming equipment which are incapable of permitting simultaneous axial contraction and radial expansion of a workpiece, nevertheless certain disadvantages have been encountered, particularly when forming beaded sidewalls for relatively large shipping drums such, for example, as a fifty-five-gallon drum or the like. Merely by way of example, difficulties have been encountered in loading an unformed blank into beading equipment of the type employing external dies and an internal hydraulically actuated expanding medium. Moreover, rupture of the expansible bag can result in significant amounts of lost operating time. As a consequence, apparatus of the type disclosed and claimed in the aforesaid Van Leer, et al. patent has not provided a completely satisfactory solution to the problems faced by manufacturers of peripherally beaded products such as container sidewalls.

Accordingly, it is a general aim of the present invention to provide improved methods and apparatus which overcome all of the foregoing disadvantages and which are characterized by their ability to form peripherally beaded products having only a minimum average net axial strain. While not so limited in its application, the invention will find especially advantageous use in the formation of a peripherally beaded cylindrical sidewall for use with sheet metal drums or similar sheet metal containers.

A related object of the invention is the provision of improved methods and apparatus for forming peripherally beaded products and for simultaneously controlling the relationship between radial expansion and axial contraction of the blank being formed, yet wherein such results are achieved without requiring the use of either externally disposed die segments or internally disposed complex deformable hydraulic expansion systems.

It is a more specific object of the invention to provide an improved beading apparatus for forming a plurality of peripherally disposed beads in a cylindrical blank, which apparatus is compact in size and wherein the effect of friction resulting from axial die movement is minimized.

An ancillary object of the invention is to provide an improved beading apparatus for cylindrical metal blanks which permits of ease and rapidity in loading such blanks onto the expanding equipment prior to a beading operation, as well as ease and rapidity of removal of such blanks from the equipment following a beading operation. In this connection, it is an object to provide a simple, reliable beading apparatus which is particularly suitable for use in mass production manufacturing operations.

In another of its important aspects, it is an object of the invention to provide improved methods and apparatus for forming peripheral beads in a cylindrical blank and wherein the blank is locally expanded in a radial direction while also being subjected to axial contraction, yet wherein such radial expansion and axial contraction are independently and positively controlled, thus greatly increasing the versatility of such beading apparatus and permitting the manufacture of products having diverse internal strain characteristics or diverse shell configurations.

Other objects and advantages of the invention will become apparent as the following description proceeds, taken in conjunction with the accompanying drawings, in which:

FIGURE 1 is a general side view of an exemplary bead expanding apparatus embodying the features of the present invention, such apparatus here shown in half section with the die segments retracted and a cylindrical blank positioned thereon in readiness for a beading operation in accordance with the invention;

FIG. 2 is a front end view of the apparatus shown in FIG. 1;

FIG. 3 is a fragmentary transverse sectional view taken substantially along the line 3—3 in FIG. 1 but with the cylindrical blank removed for purposes of clarity;

FIGS. 4 and 5 are vertical half sections of the exemplary apparatus shown in FIG. 1, respectively depicting the apparatus with the die segments partially expanded during an intermediate point in an expanding operation, and fully expanded at the completion of a beading operation;

FIG. 6 is a fragmentary sectional view of the die units taken substantially along the line 6—6 in FIG. 5;

FIG. 7 is a reduced side elevation in half section of a deformed or beaded cylindrical shell;

FIG. 8 is a fragmentary front end view, similar to FIG. 2 but on an enlarged scale, here depicting a slightly modified expanding apparatus also embodying the features of the present invention;

FIG. 9 is a vertical half section taken substantially along the line 9—9 in FIG. 8; and, FIG. 10 is a fragmentary vertical half section similar to FIG. 9, here depicting yet another modified apparatus embodying the invention.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

Referring now to the drawings, and particularly to FIGS. 1–3, there is illustrated an exemplary expanding apparatus, generally indicated at 20, which is particularly suited for forming alternating beads and furrows in a cylindrical metal blank in accordance with the present invention. As best shown in FIG. 1, the exemplary apparatus 20 includes a frame, generally indicated at 21, which is adapted to slidably receive a substantially cylindrical metal blank 22, such frame here including a centrally disposed, longitudinally extending actuator bar 23, a plurality of segmented carrier members 24 circumferentially disposed about the actuator bar 23, and a stationary main support member 25. As here shown, the main support member 25 is provided with a centrally disposed aperture 26 through which the actuator bar 23 projects.

For the purpose of effecting controlled axial reciprocation of the actuator bar 23, the latter is integrally coupled to a piston 27 adjacent one end of the bar 23 (e.g., the left-hand end of the bar 23 as viewed in FIG. 1). As here shown, the piston 27 is slidably received within a cylinder 28, the latter defining first and second chambers 29a, 29b on opposite sides of the piston 27. The arrangement is such that the chambers 29a, 29b may be selectively coupled one at a time to respective different ones of a suitable source of pressurized fluid and a bleed line (not shown) in a conventional manner well known to those skilled in the art. Thus, when the chamber 29a is coupled to a source of pressurized fluid and the chamber 29b is coupled to bleed, the piston 27 and actuator bar 23 are shifted axially to the left as viewed in FIG. 1. Conversely, when the chamber 29b is coupled to a source of pressurized fluid and the chamber 29a is coupled to a suitable bleed line, the piston 27 and actuator bar 23 are shifted axially towards the right as viewed in FIG. 1.

In carrying out the present invention, provision is made for camming the segmented carrier members 24 radially outward during the power stroke of the actuator bar 23, in this instance when the actuator bar 23 is shifted axially to the left. To accomplish this, the actuator bar 23 is formed with a plurality of axially spaced projections 30 which serve to define a plurality of axially spaced, outwardly facing cam surfaces 31. Similarly, the segmented carrier members 24 are formed with complementary axially spaced grooves 32 defining inwardly facing cam surfaces 33 which engage the cam surfaces 31 formed on the actuator bar 23. Thus, when the actuator bar 23 is shifted to the left during a power stroke, the cam surfaces 31, 33 coact to cam the segmented carrier members 24 radially outward.

In order to insure that the carrier members 24 are precluded from axial movement and constrained for movement along radial lines, each of the carrier members is slidably secured to the stationary main support 25 by means of a gib construction generally indicated at 34 (FIG. 3). As here shown, the gib construction 34 comprises a radially extending T-shaped groove 35 formed in the main support 25 and a complementary T-shaped lug 36 integrally formed on the left-hand radial face of the segmented carrier 24. For the purpose of normally urging the carriers 24 radially inward towards their nonexpanded position, compression springs 38 or the like are interposed between the outer peripheral face of each carrier member 24 and axially extending flanges 39 formed integrally with the main support member 25. Thus, the springs 38 tend to normally bias the carrier members 24 radially inward and, during an expanding operation, the carrier members 24 are cammed radially outward against the biasing effect of the springs 38.

In accordance with one of the important aspects of the present invention, provision is made for forming axially spaced alternate peripheral beads and furrows in the cylindrical metal blank 22 (FIG. 1) by locally expanding the blank in a radial direction to form beads therein while simultaneously effecting controlled axial collapse of the blank so as to move the blank material towards the beads being formed and thus minimizing the axial strain created in the finished beaded shell. To this end, a plurality of axially spaced annular die units 40a–40d are mounted on the carrier members 24 in the exemplary apparatus 20 shown in FIG. 1. As best shown by reference to FIGS. 1 and 2 conjointly, it will be observed that each of the die units includes a plurality of die segments 41 which are mounted on the carrier segments 24, there being one die segment 41 for each carrier segment 24. In order to permit axial movement of the die segments 41 relative to the carrier segments 24, the former are preferably coupled to the latter by means of a gib construction generally indicated at 43, which construction may be substantially identical to the gib construction 34 previously described.

While the exemplary apparatus shown in FIG. 1 has been depicted as including only four die units 40a–40d, it will be understood as the ensuing description proceeds that the particular number of die units used may vary in accordance with the number of beads and furrows to be formed in the blank 22. Moreover, the particular cross-sectional shape of the die segments 41 may vary dependent upon the final desired cross-sectional configuration of the beads and furrows to be formed in the blank.

For the purpose of properly positioning the die units 40a–40d relative to the carrier segments 24, axially compressible means which here take the form of stiff compression springs 44 are interposed between the die segments 41 of adjacent die units. An additional set of springs 44 are also interposed between the die segments 41 in the die unit 40d and a radial flange portion 45 integral with the innermost ends of the carrier segments 44 (i.e., the left-hand ends of the carrier segments 24 as viewed in FIG. 1). The arrangement is such that the springs 44 tend to uniformly space the segments 41 while normally urging the latter towards the right as viewed in the drawings. In order to limit movement of the die segments 41 to the right, and thus properly align the segments together in the form of segmented annular rings defining the die units 40a–40d, stop pins 46 are integrally secured to the outer surface of the carrier segments 24, the stop pins projecting radially outward from the segments 24 so as to engage one radial face of each die segment. For the purpose of limiting the distance between the die segments in adjacent ones of the die units 40a–40d when the latter are in their axially collapsed position, a plurality of spacers 47 are interposed between the segments in each adjacent set of die units.

As the ensuing description proceeds, it will become apparent that the die units will undergo varying degrees of axial travel during an expanding operation. That is, the die unit 40d will, at the completion of an expanding operation as shown in FIG. 5, have moved to the left by a distance $x$ as measured from its associated stop pin 46. However, the adjacent die unit 40c will have moved a greater distance to the left than the die unit 40d, as here indicated at $3x$. Similarly, the die unit 40b and the die unit 40a will travel axially to the left by respective distances $5x$ and $7x$ as shown in FIG. 5. In order to accommodate such varying degrees of axial movement and to insure that the stop pins 46 associated with one die unit do not interfere with the axial movement of the adjacent die unit, the die segments 41 of the intermediate die units 40b and 40c of the exemplary apparatus are provided with slots 48, thus permitting their associated stop pins to be offset inwardly relative to the outboard radial faces of the die segments.

In carrying out the present invention, provision is made for positively shifting the die units 40a–40d axially relative to the carrier segments 24 as the latter move radially outward during an expanding operation. To this end, a drawshaft 49 (FIGS. 1, 4 and 5) passes through each axial set of die segments 41, the left-hand end of the drawshaft passing through a slot 50 formed in the main support member 25. In the exemplary form of the invention, the drawshafts 49 pass through and are coaxial with the springs 44 and the spacers 47, thus serving to properly position the latter. The outermost or right-hand ends of the drawshafts 49, as viewed in the drawings, extend through the segments 41 of the outermost die unit 40a. Nuts 51 are secured to the outermost ends 52 of the drawshafts 49. In order to positively shift all of the drawshafts 49 to the left during an expanding operation, the innermost left-hand ends of the drawshafts pass through apertures 55 formed in an annular drive plate 54 which is slidably mounted on the end of the actuator bar 23 intermediate the cylinder 28 and the main support 25. To facilitate radial movement of the drawshafts 49 relative to the drive plate 54, rollers 56 are positioned on the left-hand ends of the drawshafts. In order to shift the drive plate 54, and thus the drawshafts 49, to the left during an expanding operation, the actuator bar 23 has formed thereon an integral radial flange 57. A cushioning element 58 is concentrically mounted about the actuator bar 23 and interposed between the flange 57 and the drive plate 54. Thus, movement of the actuator bar 23 to the left exerts an axial force upon the drive plate 54 through the flanges 57 and cushioning element 58 so as to shift all of the drawshafts 49 to the left.

In order to more fully understand the mode of operation of the exemplary bead forming apparatus 20, reference is now made to FIG. 1 wherein the apparatus is shown in the "start" position or nonexpanded position. Prior to initiation of an expanding operation, a cylindrical blank 22 is first placed over the die units and shifted towards the left until its innermost free edge abuts the radial flanges 45 on the carrier segments 24. If desired, suitable adjustable stop means such as an axially adjustable abutment screw (not shown) can be positioned in one or more of the flanges 45 for fine adjustment of the axial position of the blank 22 relative to the die units. The equipment is now in readiness for an expanding operation in accordance with the present invention.

In order to initiate the bead forming operation, the chamber 29a in cylinder 28 is coupled to a suitable source of pressurized fluid (not shown) while the chamber 29b is coupled directly to a suitable bleed line (not shown), thus urging the piston 27 and actuator bar 23 toward the left as viewed in the drawings. As the actuator bar moves toward the left relative to the carrier segments 24, the cam surfaces 31, 33 coact to cam the segments 24 radially outward, thus urging the die segments 41 radially outward into engagement with the blank 22 and locally deforming the latter in the regions surrounding the die units 40a–40d. As the die units move outwardly (FIG. 4), beads 61 begin to form where the blank 22 is engaged by the die segments, the beads defining intermediate circumferential furrows 62 in the areas between adjacent die units where the blank 22 is not completely expanded. At the same time that the carrier segments 24 are cammed radially outward by the actuator bar 23 and the flange 57 on the latter acts through the cushioning member to shift the drive plate 54 laterally to the left. When this occurs, the drawshafts 49 are shifted to the left so as to transmit an axial force through the nuts 51 to the die segments 41 in the outermost die unit 40a, thus shifting the latter to the left and initiating axial collapse of the blank 22.

In keeping with the invention, movement of the outermost die unit 40a to the left increases the compression in springs 44, thus causing the die units 40b–40d to also shift to the left. Assuming perfectly uniform spring characteristics and negligible frictional forces between the die segments 41 and carriers 24, the die units 40a–40d will close uniformly toward the left. However, as a practical matter some variation in spring characteristics or frictional forces may occur, thus causing the die units to move to the left in random order. In either case, the spacers 47 serve to limit the proximity of adjacent die units when the carrier segments 24 are fully expanded and the drawshafts 49 are fully shifted to the left. The net result of the foregoing operation is that as the beads 61 are formed during the expanding operation, they are simultaneously shifted to the left and the intervening furrows 62 are axially crushed due to relative closing movement between adjacent die units. As a consequence, the material in the blank in the regions of the furrows 62 is permitted to move towards the beads 61 being formed so as to minimize the axial strain created in the blank.

At the end of the expanding portion of a typical operating cycle, the die units 40a–40d, the carrier segments 24, and the actuator bar 23 are all in the position shown in FIG. 5. The pressurized fluid connections to the chambers 29a, 29b may now be reversed so as to shift the actuator bar to the right and permit the springs 38 to urge the carrier segments 24 radially inward. As soon as the carrier segments 24 have moved radially inward a sufficient distance to free the die segments 41 from the circumferential beads 61 formed in the blank 22, the segments 41 and drawshafts 49 move axially to the right under the influence of the springs 44, thus returning the die units to their initial spaced positions against the stop pins 46 in readiness for a subsequent expanding operation on the next blank. The formed shell 63 (FIG. 7) may now be removed from the apparatus 20 by sliding the shell to the right.

Referring now to FIGS. 8 and 9, a slightly modified form of bead forming apparatus generally indicated at 20A has been depicted. In this instance, the apparatus 20A includes a main support member 100 which is similar to the support member 25 shown in FIG. 1. Integral with and projecting axially from the main support member 100 is a fixed longitudinally extending support bar 101 which serves to telescopically mount a rotatable cylinder 102. While the cylinder 102 is here mounted with freedom for rotation relative to the support bar 101, axial movement of the cylinder is prevented by means of a flange 103 formed on the inner end of the cylinder and held axially in place by means of a retaining member 104 integral with the main support member 100. For the purpose of rotating the cylinder 102, a gear 106 is rigidly secured thereto as by welding, the gear 106 here being meshed with and diven by a gear 107 mounted on a drive shaft 108 which is connected to and rotatably driven by any suitable power source (not shown).

For the purpose of forming beads in a cylindrical metal blank 22, a plurality of expanding die units, generally indicated at 111, are mounted on the support member 101. In the exemplary apparatus 20A shown in FIG. 9, the die units 111 each include an annular carrier ring 112, the carrier rings being internally threaded as indicated at 113 and supported on respective different ones of a plurality of externally threaded cylinders 109 which are splined or otherwise keyed to the rotatable cylinder 102 for rotation therewith while being free to move axially relative thereto. To insure that the die units 111 move axially in unison, the externally threaded cylinders 109 are each provided with a flange 110 adapted to be rotatably received within a counterbore formed in the adjacent carrier ring 112 and retained axially in place therein by means of retaining rings 115. Thus the arrangement is such that when the rotatable cylinder 102 is driven by the drive gear 107, the cylinders 109 are each threaded relative to their associated carrier rings 112. As the threaded cylinders 109 are, for example, threaded into engagement with their associated carrier rings 112, they slide axially relative to the rotatable cylinder 102, and, at the same time, the adjacent carrier ring 112 is shifted axially (to the left as viewed in FIG. 9) as a result of interconnection to the flange 110 on the threaded cylinder 109.

For the purpose of locally expanding cylindrical metal blanks, each of the die units 111 further includes a plurality of circumferentially disposed arcuate die segments 118 having a generally T-shaped cross section (as best shown in FIG. 9). In the exemplary form of the invention, the lower ends of the T-shaped die segments 118 are received within a circumferentially disposed slot 116 formed in the carrier rings 112, each slot 116 here intersecting with a plurality of transversely extending slots 117 (FIGS. 8 and 9) which pass axially through the rings 112. For the purpose of holding the segments 118 in place in the slots 116, the segments include a peripheral groove within which is seated a garter spring 119 and an elastic O-ring 120. The arrangement is such that the garter spring serves to urge the segments radially inward into the slot 116 while the O-rings provide a resilient surface between the die segments 118 and the blank 22. Of course, it will be understood to those skilled in the art that the external surface of the die segments 118 may have any one of numerous cross-sectional configurations dependent upon the desired configuration of the finished product—for example, the die segments could have a concave cross-sectional shape rather than the generally convex cross-sectional shape defined by the segments 118 and the O-ring 120.

In carrying out the present invention, provision is made for expanding the die segments 118 and O-rings 120 radially outward so as to engage and deform the cylindrical metal blank 22 positioned thereabout. To accomplish this, and as best shown in FIG. 9, an expanding assembly, generally indicated at 121, is provided, the assembly here including a plurality of sets of axially extending tapered expander bars 123 and complementary tapered actuator bars 124, there being one set of bars 123, 124 extending axially through each alined set of transverse slots 117 formed in the carrier rings 112. The bars 123, 124 are so oriented that the inclined surfaces thereof are in mutual engagement, thus defining a cam surface. In order to insure that the bars 123 are constrained for radially outward movement within the slots 117, the bars are provided with flanges 123a which are slidably secured to the main support member 100 in any suitable manner such, for example, as by a gib construction substantially identical to the gib construction 34 previously described in connection with the apparatus shown in FIG. 1. Compression springs 125 are positioned between the outer ends of the flanges 123a and the main support member 100, thus serving to bias the bars 123 radially inward towards the axis of the apparatus 20A.

In order to shift the actuator bars 124 in unison towards the left-hand end of the apparatus 20A (as viewed in FIG. 9), the left ends of the bars 124 are rigidly secured to an annular disc 126, the latter having an axially extending integral stub shaft 126a coupled to a piston 128 disposed within a cylinder 127. Thus, when a suitable source of pressure fluid (not shown) is coupled to the chamber 129a within the cylinder 127, the opposite chamber 129b being coupled to bleed, the piston 128 is shifted to the left, thereby drawing all of the actuator bars 124 to the left and camming the tapered bars 123 radially outward. When this occurs, the die segments 118 in the die units 111 are all driven radially outward in unison by coaction between the expander bars 123 and the segments 118. Conversely, when pressure fluid is supplied to the chamber 129b and the chamber 129a is coupled to bleed, the piston 128 is driven to the right (as viewed in the drawings), thus shifting all of the actuator bars 124 to the right and permitting the expander bars 123 to move toward the axis of the machine under the influence of the springs 125.

During an expanding operation, and after a blank 22 has been properly position on the apparatus 20A in surrounding relationship relative to the die units 111, pressure fluid is coupled to the chamber 129a in the manner described above, thus shifting the actuator bars 124 to the left and initiating simultaneous radial expansion of all of the die segments 118. Preferably at the same time, the drive shaft 108 is coupled to a suitable external power source so as to impart rotational movement to the cylinders 109 through the gears 107, 106, thus drawing each of the carrier rings 112 towards the adjacent left-hand carrier ring with all of the rings closing relative to their adjacent rings by substantially the same amount of axial travel. Of course, in this form of the invention it will be understood that radial expansion and axial contraction of the die units 111 are achieved independent of one another—that is, the die units 111 can be collapsed axially simultaneously with radial expansion during all or part of the outward motion of the die units or, alternatively, axial contraction may take place in part or in total either before or after completion of outward expansion of the die units. Moreover, the amount of axial movement of the die units 111 can be controlled completely independently of the degree of radial expansion, thereby greatly increasing the versatility of the apparatus and permitting the formation of peripherally beaded products having selectively variable and controllable axial strain characteristics.

Upon completion of the bead forming portion of an operating cycle, the pressure fluid connections to the chambers 129a, 129b are reversed, thus pressurizing the chamber 129b and coupling the chamber 129a to bleed. When this occurs, the piston 128 and actuator bars 124 are driven to the right, thus permitting radial collapse of the expander bars 123 under the influence of the springs 125. As the expander bars 123 move towards the axis of the apparatus, the garter springs 119 retract the die segments 118, thereby permitting removal of the formed shell from the apparatus. The source of rotatable power for the shaft 108 is then reversed so as to return the threaded cylinders 109 and carrier rings 112 to their initial positions.

For the purpose of accurately positioning the carrier rings 112, a plurality of positioning bars 130 are secured to the main support member 100 and to the innermost or left-hand carrier ring 112. Thus, the bars 130 serve to anchor the left-hand die unit 111 and prevent axial movement thereof. If desired, the positioning bars 130 may be axially adjustable so as to vary the initial axial position of the left-hand die unit 111 and consequently so as to control the initial spacing between the innermost ring 112 and the main support member 100, thus properly orienting the blank 22 relative to the die units 111. Alternatively, the apparatus 20A may include an axially adjustable abutment screw 131 which here serves to position the innermost edge of the blank 22 when the latter is loaded onto the apparatus. Thus, by suitable adjustment of the screw 131, the blank can be selectively positioned so that beads are formed therein at a reference spacing from the end of the blank.

Turning now to FIG. 10, there is shown a slightly modified bead expanding apparatus 20B which is quite similar in construction and operation to that shown in FIG. 9, but which also embodies certain of the features of the apparatus shown in FIG. 1. However, in the exemplary apparatus shown in FIG. 10, the construction is such that the frictional forces developed during operation are minimized or, stated in other words, the frictional forces developed between the bearing surface of the tapered bar 123 and the die segments 118 on the one hand and, the bearing surface of the tapered actuator bar 124 and the rings 112, on the other hand, are equal and in opposite directions, thus serving to cancel one another. To this end, the apparatus 20B includes a main support member 100d having a centrally disposed, longitudinally extending, support bar 100d affixed thereto which, in this instance, directly and slidably supports a series of spaced carrier rings 112d. As in the form of the invention shown in FIG. 9, the rings 112d each have an annular slot 116d adapted to receive a plurality of circumferentially disposed die segments 118d. Similarly, a plurality of radially disposed transverse slots 117d are formed in the carrier rings for the purpose of receiving axially extending tapered expander bars 123d and tapered actuator bars 124d which form part of the expanding mechanism 121d. In this form of the invention, however, stiff compression springs S, which are similar to the springs 44 (FIG. 1), are interposed between the carrier rings 112d, such springs S serving the same function as the springs 44 (FIG. 1) and here replacing the threaded cylinders 109 shown in FIG. 9. Thus, the springs S serve not only to uniformly space the carrier rings and urge the latter to the right as viewed in FIG. 10, but also to transmit axial forces from ring to ring during an expanding operation so as to cause axial collapse of the die units 111d.

For the purpose of shifting the actuator bars 124d in an axial direction, the innermost or left-hand ends of the bars are rigidly affixed to an annular drive disc 126 having a coaxial stub shaft 126a integral with a piston 128 disposed within a hydraulic cylinder 127, the latter defining pressure chambers 129a, 129b on opposite sides of the piston 128. In order to transmit axial force from the actuator bars 124d to the die units 111d, abutment members 132 are provided at the outermost or right-hand ends of the actuator bars 124d, the abutment members serving to contact the outermost die unit 111d during the power stroke of the actuator bars as the piston 128 is driven to the left. When this occurs, the outermost die unit 111d starts to move axially to the left and axial forces are thus transmitted through the compression springs S to move adjacent die units to the left as the die units are expanded.

In keeping with this form of the invention, it will be appreciated by those skilled in the art that as the die segments 118d move radially outward to expand the blank 22, a radial inward force P is exerted on each of the die segments 118d. For the purpose of the ensuing description, it can be assumed that the forces P are the only significant forces acting in a radial direction upon the die units. While there may be some variations in the radial components of force, for example, because of manufacturing irregularities or the like, such variations may be held to a minimum and do not contribute significantly to the magnitude of the radial force components P.

Keeping in mind the previous operational description of the apparatus 20B shown by way of example in FIG. 10, it will be appreciated that during an expanding operation, the tapered expander bars 123d move axially to the left. The carrier rings 112d also move axially to the left, but at a relatively slow speed compared with the speed of the actuator bars 124d. Thus, the arrangement is such that the interface between the die segments 118d and the expander bars 123d define bearing surfaces wherein significant axial components of frictional force are developed. Since the carrier rings 112d and die segments 118d are moving to the left relative to the expander bars 123d, the frictional force $F_r$ is directed to the right and such frictional force will be equal to $\mu P$, where $\mu$ is the coefficient of friction of the bearing material.

A second significant axially directed frictional force $F_1$ is created during the expanding operation at the interfaces between the actuator bars 124d and the carrier rings 112d. However, in this instance the actuator bars are moving to the left at a relatively high rate of speed as compared with the rate of axial movement of the carrier rings 112d. Consequently, the carrier rings, while actually moving to the left, are moving to the right relative to the actuator bars and, therefore, the axial components of the frictional forces $F_1$ are directed to the left. The magnitude of the frictional force $F_1$ is equal to $\mu P$, where $\mu$ is the coefficient of friction of the bearing material. Preferably, the carrier rings 112d, die segments 118d, expander bars 123d, and actuator bars 124d, the components which define the bearing surfaces, are all made of the same material. Consequently, the coefficient of friction $\mu$ is the same at the two friction interfaces and, therefore, the magnitude of the force $F_r$ is equal to the magnitude of the force $F_1$. Since these forces are oppositely directed, they serve to cancel one another during an expanding operation, thereby serving to eliminate friction as a factor in an expanding operation.

It will be appreciated that the friction cancellation feature described above is also present in the exemplary apparatus 20A shown in FIG. 9. However, since the carrier rings 112 in the apparatus 20A are mechanically coupled together for controlled relative axial movement by means of the threaded cylinders 109, the friction cancellation feature is unimportant. On the other hand, in apparatus such as the exemplary expander 20B shown in FIG. 10, friction cancellation insures that the die units 111 move leftwardly substantially in unison and at desired rates so as to accurately control the configuration of the finished beaded shell.

It will be appreciated from the foregoing that there has herein been disclosed relatively simple and compact apparatus which is highly effective in producing beaded products having minimum average axial strain. This advantageous result is achieved by controlled positive axial collapse of the die segments during the expanding operation, thus insuring that the metal in the blank on both sides of the beads being formed moves toward the beads during the forming operation. Of course, the particular cross-sectional configuration of the beads and the number of beads formed in a given shell may vary over a wide range dependent upon the use to which the shell is to be put.

The apparatus in accordance with the present invention produces a drum body or sidewall formed over substantially its entire length with a plurality of radially outwardly extending peripheral beads 61 separated by a plurality of radially inwardly extending peripheral furrows 62, with the alternate beads and furrows being so interrelated and associated with one another as to form a container sidewall construction which exhibits optimum performance characteristics in terms of "balanced strength" and resistance to deformation forces. In the exemplary deformed or beaded shell shown in FIG. 7, four such beads 61 are formed in the sidewall, the beads being respectively spaced apart by three furrows 62.

Of course, while four beads 61 and three furrows 62 have been shown, it will be understood that the particular number of beads and furrows may be varied without departing from the invention. It is important, however, that the beads and furrows be interrelated and associated with one another in accordance with particular criteria which are set forth in the aforementioned copending Coppens applications. The apparatus in accordance with the present invention enables the production of such peripherally beaded products wherein the strains in the formed sidewall are primarily limited to circumferential strains, while axial strains are substantially minimized and the beaded product is characterized by its high resistance to loads, shocks and similar forces which tend to deform or otherwise damage containers during transportation or storage. Therefore, in the appended claims it is intended that the term "plurality" connote at least the formation of three beads.

We claim as our invention:

1. Apparatus for expanding a plurality of axially spaced peripheral beads separated by a plurality of peripheral furrows in a cylindrical shell wherein the average net axial strain produced in the shell during bead formation is minimized comprising, in combination, frame means adapted to slidably receive said shell, at least three annular, axially spaced die units disposed about the periphery of said frame, each of said die units comprising a plurality of arcuate segments, said segments being radially expansible and axially shiftable relative to said frame, means for radially expanding said die segments into engagement with said shell to form beads thereon, and means associated with each of said die units for effecting positive controlled axial collapse of said die units so that said alternating beads and furrows are formed in said shell.

2. Apparatus for expanding a plurality of axially spaced peripheral beads alternating with peripheral furrows in a cylindrical shell wherein the average net axial strain produced in the shell during bead formation is minimized, comprising, in combination, frame means adapted to slidably receive said shell, at least three annular, axially spaced die units disposed about the periphery of said frame, each of said die units comprising a plurality of arcuate segments, said segments being radially expansible and axially shiftable relative to said frame, means for radially expanding said die segments into engagement with said shell to form beads thereon, and means associated with each of said die units for independently and selectively effecting positive controlled axial collapse of said die units so that well defined alternating beads and furrows are formed in said shell.

3. Apparatus for expanding annular beads separated by annular furrows in a cylindrical shell comprising, in combination, frame means adapted to slidably receive said shell wherein the average net axial strain produced in the shell during formation of said beads and furrows is minimized, at least three segmented annular die units peripherally disposed about said frame, said segmented annular die units peripherally disposed about said frame and axially spaced from one another, each of said die units being radially expansible, at least two of said die units being axially shiftable relative to another die unit, means for radially expanding said die units into engagement with said shell, and means associated with each of said shiftable die units for positively shifting said relatively shiftable die units toward said other die unit to compress the shell between the die units.

4. Apparatus for forming annular beads separated by annular furrows in a cylindrical shell wherein the average net axial strain produced in the blank during bead and furrow formation is minimized comprising, in combination, frame means adapted to slidably receive said shell, a first segmented annular die unit peripherally disposed about said frame, a second segmented annular die unit peripherally disposed about said frame and axially spaced from said first die unit, a third segmented annular die unit peripherally disposed about said frame and axially spaced from said second die unit, each of said die units being radially expansible, said second die unit and said third die unit being axially shiftable relative to said first die unit, means for radially expanding said first, second and third die units into engagement with said shell, and means associated with each of said shiftable die units for simultaneously and positively shifting each of said die units to compress the shell between the die units.

5. The method of forming a plurality of axially spaced radially outwardly extending peripheral beads separated by a plurality of radially inwardly extending peripheral furrows in a sheet metal shell wherein the average net axial strain produced in the shell during bead formation is minimized comprising the steps of placing said shell about a plurality of radially expansible and axially shiftable die units, expanding said die units into engagement with said shell to form said beads thereon, and simultaneously positively shifting each of said die units axially for compressing said furrows in said shell.

6. The method of forming a plurality of axially spaced outwardly extending peripheral beads separated by a plurality of radially inwardly extending peripheral furrows in a sheet metal shell wherein the average net axial strain produced in the shell during bead formation is minimized comprising the steps of placing said shell about a plurality of radially expansible and axially shiftable die units, expanding said die units into engagement with said shell to form beads thereon, and independently positively shifting each of said die units axially for compressing furrows in said shell.

7. Apparatus for forming a plurality of axially spaced peripheral beads separated by a plurality of peripheral furrows in a cylindrical shell wherein the average net axial strain produced in the shell during bead formation is minimized comprising, in combination, a frame adapted to slidably receive said shell, said frame including a centrally disposed longitudinally extending actuator bar having axially spaced camming surfaces thereon and a plurality of expanding segmental carriers circumferentially mounted about said actuator bar, said carriers having axially spaced camming surfaces engaging with the camming surfaces on the bar, means for axially shifting said bar relative to said carriers thereby camming said carriers radially outward, a plurality of axially spaced segmented annular dies seated on said carriers, said dies being axially shiftable relative to the carriers, means for shifting all of the dies along the carriers, and means for positively moving said dies axially so that when said bar is actuated said die segments substantially simultaneously expand radially and collapse axially to define alternating beads and furrows in said shell.

8. Apparatus for forming a plurality of axially spaced peripheral beads separated by a plurality of peripheral furrows in a cylindrical shell wherein the average net strain produced in the shell during bead formation is minimized comprising, in combination, a frame adapted to slidably receive said shell, said frame including a centrally disposed longitudinally extending actuator bar having axially spaced camming surfaces thereon and a plurality of expanding segmental carriers circumferentially mounted about said actuator bar, said carriers having axially spaced camming surfaces engaging with the camming surfaces on the bar, means for axially shifting said bar relative to said carriers thereby camming said carriers radially outward, a plurality of axially spaced segmented annular dies seated on said carriers, said dies being axially shiftable relative to the carriers, axially compressible force transmitting means interposed between adjacent die segments for transmitting axial force from one set of annular dies to the adjacent set of dies, and means for moving said dies axially so that when said bar is actuated said die segments are substantially simultaneously expanded radially and collapsed axially to define alternating beads and furrows in said shell.

9. Apparatus for forming a plurality of axially spaced peripheral beads in a cylindrical shell comprising, in combination, a frame adapted to slidably receive said shell, said frame including a centrally disposed longitudinally extending actuator bar having camming surfaces thereon and a plurality of expanding segmental carriers circumferentially mounted about said actuator bar, said carriers having camming surfaces engaging with the camming surfaces on the bar, means for axially shifting said bar relative to said carriers thereby camming said carriers radially outward, a plurality of axially spaced segmented annular dies seated on said carriers, said dies being axially shiftable relative to the carriers, a plurality of springs interposed between adjacent die segments for transmitting axial force from one set of annular dies to the adjacent set of dies, and means for moving said dies axially so that when said bar is actuated said die segments are substantially simultaneously expanded radially and collapsed axially to define alternating beads and furrows in said shell 10. Apparatus for forming a plurality of axially spaced peripheral beads in a cylindrical shell, comprising, in combination, a frame adapted to slidably receive said shell, said frame including a centrally disposed longitudinally extending support bar, a rotatable cylinder disposed about said support bar, a plurality of externally threaded cylinders slidably keyed to said rotating cylinder for rotation therewith and simultaneous axial movement relative thereto, a plurality of axially spaced nonrotatable rings having internally threaded bores threadably carried by respective ones of said threaded cylinders, each of said threaded cylinders rotatably coupled to an adjacent one of said rings for shifting said adjacent one of said rings axially relative to the ring with which said threaded cylinder is threadably coupled, each of said rings having a peripherally disposed annular slot and a plurality of radially disposed transverse slots therein, each of said rings carrying a plurality of substantially T-shaped die segments disposed within said annular slot with the lower portions of said die segments protruding into said transverse slots, a first tapered bar extending axially through each set of transverse slots in said rings, a second tapered bar extending axially through each axial set of transverse slots in said rings, said tapered bars defining camming surfaces therebetween, actuator means connected to said second tapered bar for axial movement thereof thereby camming said first tapered bar and said die segments radially outward to form beads in said shell, and means for rotating said rotatable cylinder so that said nonrotatable rings are threaded relative to their associated threaded cylinders and thus are drawn together by substantially the same amount to form alternating beads and compressed furrows in said shell.

11. Apparatus for forming annular beads separated by annular furrows in a cylindrical shell wherein the average net axial strain produced in the shell during bead formation is minimized comprising, in combination, frame means adapted to slidably receive said shell, said frame means including a centrally disposed, longitudinally extending actuator bar, said bar having a camming surface thereon, a plurality of expanding segmental carriers circumferentially mounted about said actuator bar, each of said carriers having a camming surface engaging with the camming surface on the bar, means for shifting said bar axially relative to said carriers thereby camming said carriers radially outward, at least three axially spaced segmented annular dies seated on said carriers, each of said dies being axially shiftable relative to the other of said dies, means associated with each of said shiftable dies for positively shifting said shiftable dies axially along said carriers, and means for urging said carriers radially inward so that when said actuator bar is retracted said die units are disengaged from the formed shell.

12. Apparatus for forming axially spaced peripheral beads in a substantially cylindrical metal shell comprising, in combination, a frame adapted to slidably receive the shell, first and second spaced die units disposed about said frame, each of said die units including a plurality of segmented dies, compressible means disposed between said die units, a first tapered bar extending axially through each of said die units in bearing contact with said die segments and defining a first friction surface therebetween, a second tapered bar extending through said die units and in engagement with said first tapered bar to define a camming surface therebetween, said second tapered bar defining a second friction surface with said die units, means for shifting one of said bars axially so that said die segments are carried radially outward to expand said shell and so that a first axial component of friction force is created at one of said first and second friction surfaces, and abutment means associated with said axially moving bar for positively moving said die units axially to compress furrows in said shell whereupon a second axial component of frictional force is created at the other of said first and second friction surfaces, said first and second axial components of frictional force being oppositely directed, said die units and said bars being formed of materials having substantially the same coefficient of friction whereby said oppositely directed frictional force components are equal and thus serve to cancel one another.

13. Apparatus for forming a plurality of axially spaced peripheral beads in a cylindrical shell comprising, in combination, a frame, a plurality of coaxial carrier rings supported on said frame with freedom for axial movement relative to one another and said frame, a plurality of die segments supported on each of said carrier rings with freedom for radial movement relative thereto, expander bar means mounted on said frame and passing through said rings, said expander bar means in engagement with said die segments and free for movement in only a radial direction, actuator bar means mounted on said frame and passing through said rings, said actuator bar means in engagement with said rings and free for movement in only an axial direction relative to both said rings and said frame, said actuator bar means and said expander bar means being in mutual engagement and defining a cam surface therebetween so that axial movement of the former cams the latter radially outward so as to expand said die segments, and power means for shifting said actuator bar means in an axial direction, said expander bar means and said die segments defining first bearing surfaces wherein the axial components of frictional forces developed during an expanding operation are directed in a first axial direction, said actuator bar means and said carrier rings defining second bearing surfaces wherein the axial components of frictional forces developed during an expanding operation are directed opposite to said first axial direction, said rings, die segments, expander bar means and actuator bar means being formed of materials having substantially the same coefficient of friction whereby said oppositely directed frictional force components are equal and thus serve to cancel one another.

References Cited

UNITED STATES PATENTS

| | | | |
|---|---|---|---|
| 743,193 | 11/1903 | Rainforth | 72—370 |
| 1,645,971 | 10/1927 | Riegel | 113—120 |
| 1,825,030 | 9/1931 | Vaughn | 113—120 |
| 1,825,081 | 9/1931 | McKay | 72—393 |
| 2,089,476 | 8/1937 | Grotnes | 72—393 |

CHARLES W. LANHAM, *Primary Examiner.*

E. M. COMBS, *Assistant Examiner.*